United States Patent
Jeong et al.

(10) Patent No.: US 9,899,881 B2
(45) Date of Patent: Feb. 20, 2018

(54) WIRELESS POWER TRANSMITTING DEVICE

(71) Applicant: SAMSUNG ELECTRO-MECHANICS CO., LTD., Suwon-si (KR)

(72) Inventors: In Wha Jeong, Suwon-si (KR); Young Woon Choi, Suwon-si (KR); Tae Won Heo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 140 days.

(21) Appl. No.: 15/130,028

(22) Filed: Apr. 15, 2016

(65) Prior Publication Data

US 2016/0359369 A1 Dec. 8, 2016

(30) Foreign Application Priority Data

Jun. 8, 2015 (KR) .................. 10-2015-0080306
Sep. 15, 2015 (KR) .................. 10-2015-0130545

(51) Int. Cl.
| | |
|---|---|
| *H01F 27/42* | (2006.01) |
| *H01F 37/00* | (2006.01) |
| *H01F 38/00* | (2006.01) |
| *H02J 50/12* | (2016.01) |
| *H02M 7/537* | (2006.01) |
| *H02J 50/40* | (2016.01) |
| *H02M 1/00* | (2006.01) |
| *H02J 7/02* | (2016.01) |

(52) U.S. Cl.
CPC .............. *H02J 50/12* (2016.02); *H02J 50/40* (2016.02); *H02M 7/537* (2013.01); *H02J 7/025* (2013.01); *H02M 2001/0074* (2013.01)

(58) Field of Classification Search
USPC .......................................... 307/104; 320/108
See application file for complete search history.

(56) References Cited

U.S. PATENT DOCUMENTS

| | | | | |
|---|---|---|---|---|
| 8,338,991 | B2* | 12/2012 | Von Novak | ............. H02J 17/00 307/104 |
| 8,716,977 | B2* | 5/2014 | Walley | ................ H01M 2/0267 307/104 |
| 8,942,624 | B2* | 1/2015 | Singh | ................... H04B 5/0037 307/104 |
| 8,975,772 | B2* | 3/2015 | Lakirovich | ............. H02J 5/005 307/104 |
| 9,030,051 | B2* | 5/2015 | Muratov | ................. H02J 5/005 307/104 |
| 9,707,406 | B1* | 7/2017 | Dellamano | .......... H04B 5/0031 |
| 9,748,774 | B2* | 8/2017 | Van Den Brink | ...... H02J 5/005 |
| 9,772,401 | B2* | 9/2017 | Widmer | .................. G01S 13/04 |

(Continued)

FOREIGN PATENT DOCUMENTS

| | | |
|---|---|---|
| KR | 20-0217303 Y1 | 3/2001 |
| KR | 10-2015-0049858 A | 5/2015 |

*Primary Examiner* — Adam Houston
(74) *Attorney, Agent, or Firm* — NSIP Law (57) ABSTRACT

A wireless power transmitting device includes: a rectifier configured to rectify alternating current (AC) power; a capacitor configured to store the rectified AC power as direct current (DC) power; a voltage divider configured to divide a voltage of the DC power; and a wireless power transmitter configured to wirelessly transmit power using the voltage divided by the voltage divider.

22 Claims, 6 Drawing Sheets

(56) References Cited

U.S. PATENT DOCUMENTS

| | | | | |
|---|---|---|---|---|
| 2009/0133942 A1* | 5/2009 | Iisaka | ............... | H02J 7/025 178/43 |
| 2015/0001950 A1* | 1/2015 | Chung | ............... | H01F 38/14 307/104 |
| 2015/0001958 A1* | 1/2015 | Abe | ............... | H02J 5/005 307/104 |
| 2015/0028689 A1* | 1/2015 | Arisawa | ............... | G01V 3/101 307/104 |
| 2016/0056664 A1* | 2/2016 | Partovi | ............... | H02J 7/025 307/104 |
| 2016/0164307 A1* | 6/2016 | Shibata | ............... | H02J 7/025 307/104 |
| 2016/0181855 A1* | 6/2016 | Muurinen | ............... | H02J 7/025 320/108 |
| 2016/0197492 A1* | 7/2016 | Fujita | ............... | H01F 38/14 307/104 |
| 2016/0359369 A1* | 12/2016 | Jeong | ............... | H02J 50/12 |
| 2017/0018951 A1* | 1/2017 | Park | ............... | H02J 5/005 |
| 2017/0063163 A1* | 3/2017 | Fukuzawa | ............... | H02J 50/12 |
| 2017/0250574 A1* | 8/2017 | Min | ............... | H02J 50/12 |
| 2017/0299753 A1* | 10/2017 | Candy | ............... | G01V 3/10 |

\* cited by examiner

WIRELESS POWER TRANSMITTING DEVICE

CROSS-REFERENCE TO RELATED APPLICATION(S)

This application claims the benefit under 35 U.S.C. § 119(a) of Korean Patent Application No. 10-2015-0080306 filed on Jun. 8, 2015 and 10-2015-0130545 filed on Sep. 15, 2015 in the Korean Intellectual Property Office, the entire disclosures of which are incorporated herein by reference for all purposes.

BACKGROUND

1. Field

The following description relates to a wireless power transmitting device.

2. Description of Related Art

Currently, wireless power transfer technology has been widely used in the chargers of various electronic devices such as communications devices as well as in smartphones and wearable devices in accordance with current trends.

As the wireless power transfer technology, a magnetic induction method and a magnetic resonance method have both been developed. A magnetic induction method according to the wireless power consortium (WPC) standard, for example, generally operates with certain characteristics, such as voltage or frequency (e.g. within a frequency of about 110 kHz to about 205 kHz), and a magnetic resonance method according to the alliance for wireless power (A4WP) standard, for example, operates with certain other characteristics, such as voltage or frequency (e.g. within a frequency of about 6.78 MHz).

When the magnetic induction method is used, it may be disadvantageous, in that long range wireless charging may be difficult, and when the magnetic resonance method is used, a problem may arise in that there may be limitations on receiving wireless power due to a complex circuit or one fixed resonance frequency.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to one general aspect, a wireless power transmitting device includes a rectifier configured to rectify alternating current (AC) power; a capacitor configured to store the rectified AC power as direct current (DC) power; a voltage divider configured to divide a voltage of the DC power; and a wireless power transmitter configured to transmit power using the voltage divided by the voltage divider.

The voltage divider may include a first capacitor configured to divide a voltage of the DC power and storing a first divided power; and a second capacitor configured to divide the voltage of the DC power and storing a second divided power.

The wireless power transmitter may include a first wireless power transmitter configured to wirelessly transmit power using the first divided power; and a second wireless power transmitter configured to wirelessly transmit power using the second divided power.

The first wireless power transmitter may include a first DC-AC converter configured to convert a voltage of the first divided power into a first output voltage for wireless power transmission, and a first transmitting resonator configured to transmit power according to the first output voltage; and the second wireless power transmitter may include a second DC-AC converter configured to convert a voltage of the second divided power into a second output voltage for wireless power transmission, and a second transmitting resonator configured to transmit power according to the second output voltage.

Each of the first DC-AC converter and the second DC-AC converter may include a serially connected half bridge or full bridge structure.

The first transmitting resonator may include a capacitor and an inductor, configured to determine a first resonance frequency; and the second transmitting resonator may include a capacitor and an inductor, configured to determine a second resonance frequency.

A resonance frequency of the first transmitting resonator and a resonance frequency of the second transmitting resonator may be different.

According to another general aspect, a wireless power transmitting device includes a rectifier configured to rectify alternating current (AC) power; an input capacitor configured to store the rectified Ac power as direct current (DC) power; a voltage divider including a plurality of capacitors connected to the input capacitor in parallel and configured to divide a voltage of the DC power; and a wireless power transmitter connected to one end of at least one of the capacitors and configured to wirelessly transmit power.

The voltage divider may include: a first voltage divider including a plurality of capacitors configured to divide and store a voltage of DC power stored in the input capacitor and a first capacitor switch selecting a voltage of one end of one of the capacitors as a first input voltage; and a second voltage divider including a plurality of capacitors configured to divide and store a voltage of DC power stored in the input capacitor and a second capacitor switch selecting a voltage of one end of one of the capacitors as a second input voltage.

The wireless power transmitter may include: a first wireless power transmitter configured to wirelessly transmit power using the first input voltage; and a second wireless power transmitter configured to wirelessly transmit power using the second input voltage.

The first wireless power transmitter may include a first DC-AC converter configured to convert the first input voltage into a first output voltage for wireless power transmission, and a first transmitting resonator configured to transmit power according to the first output voltage; and the second wireless power transmitter may include a second DC-AC converter configured to convert the second input voltage into a second output voltage for wireless power transmission, and a second transmitting resonator configured to transmit power according to the second output voltage.

Each of the first DC-AC converter and the second DC-AC converter may include a serially connected half bridge or full bridge structure.

The first transmitting resonator may include a capacitor and an inductor, configured to determine a first resonance frequency; and the second transmitting resonator may include a capacitor and an inductor, configured to determine a second resonance frequency.

A resonance frequency of the first transmitting resonator and a resonance frequency of the second transmitting resonator may be different.

According to another general aspect, a method of controlling a wireless power transmitter, includes: identifying a wireless power receiver characteristic; selectively dividing an input voltage into a divided voltage by actuating a multi-tap capacitor network according to the identified wireless power receiver characteristic; and, adaptively adjusting a duty cycle of a DC-AC converter or capacitance of a variable capacitor, or combinations thereof, to transform the divided voltage into a wireless power transmission voltage substantially corresponding to the identified wireless power receiver characteristic.

The method may further include actuating a rectifier to rectify a first voltage to the input voltage.

The selectively actuating a multi-tap capacitor network may include actuating a controller to set a switch coupled to the multi-tap capacitor network based on the identified wireless power receiver characteristic.

A controller may be executed to adaptively adjust the duty cycle or the capacitance of the variable capacitor, or combinations thereof, based on a detected harmonic component or electromagnetic interference (EMI), or combinations thereof, to iteratively adjust the wireless power transmission voltage to approximate a voltage corresponding to the identified wireless power receiver characteristic.

The duty cycle may be adaptively adjusted centered approximately around a 0.5 duty cycle.

The method may further include selectively actuating one of a plurality of resonators based on the identified wireless power receiver characteristic.

A first resonator of the plurality of resonators may be selectively actuated responsive to a detected Wireless Power Consortium (WPC) or Power Matters Alliance (PMA) wireless power receiver characteristic; and a second resonator of the plurality of resonators may be selectively actuated responsive to a detected Alliance For Wireless Power (A4WP) wireless power receiver characteristic.

The first resonator of the plurality of resonators may be selectively actuated for magnetic inductance based wireless power transmission and a second resonator of the plurality of resonators may be selectively actuated for magnetic resonance based wireless power transmission.

Other features and aspects will be apparent from the following detailed description, the drawings, and the claims.

BRIEF DESCRIPTION OF THE DRAWINGS

The above and other aspects, features and other advantages of the present disclosure will be more clearly understood from the following detailed description taken in conjunction with the accompanying drawings, in which:

FIGS. 4A through 5B are diagrams for comparison of harmonic components according to a switching duty.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, embodiments will be described as follows with reference to the attached drawings.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as illustrated in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments will be described with reference to schematic view illustrations. In the drawings, for example, due to manufacturing techniques and/or tolerances, modifications of the shape shown may result. Thus, embodiments should not be construed as being limited to the particular shapes of regions shown herein, but should, for example, be understood to include a change in shape resulting from manufacturing. The following embodiments may also be constituted by one or a combination thereof.

Figure 1:
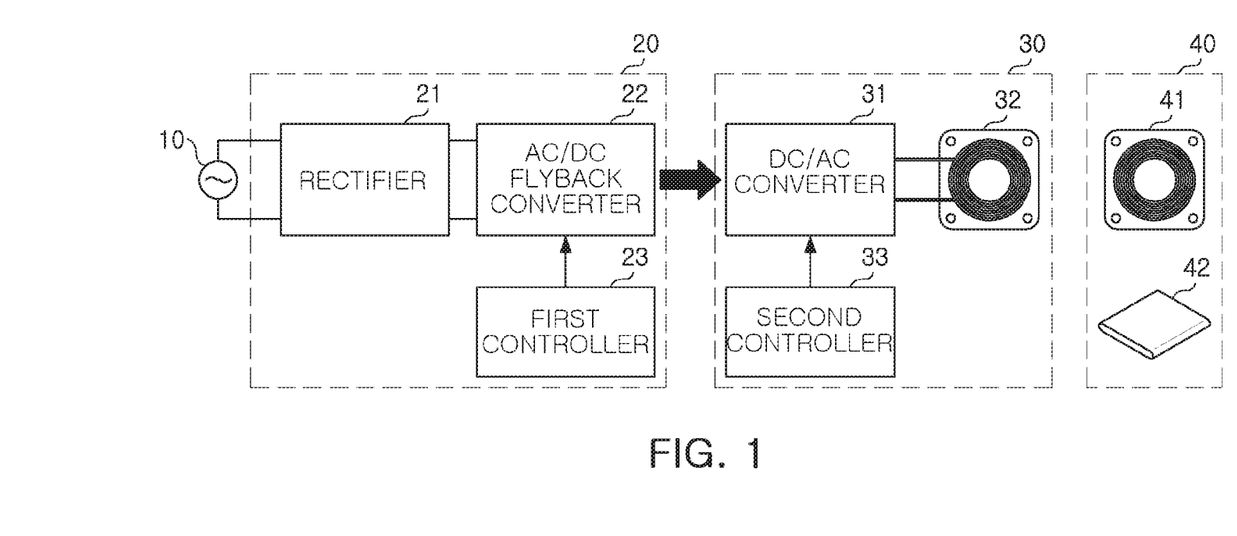
FIG. 1 is a block diagram illustrating an example of a wireless power transmitting device and a wireless power receiving device.

As illustrated in FIG. 1, the wireless power transmitting device includes an alternating current (AC) power supply 10, an AC-direct current (DC) adapter 20, and a wireless power transmitter 30. In addition, the wireless power receiving apparatus 40 includes a receiving coil 41 and a battery 42.

The AC-DC adapter 20 of the wireless power transmitting device includes a rectifier 21 rectifying AC power provided from the AC power supply 10, an AC/DC flyback converter 22 converting the power rectified by the rectifier 21 into DC power, and a first controller 23 switching the AC/DC flyback converter 22.

The wireless power transmitter 30 of the wireless power transmitting device includes a DC/AC converter 31 converting DC power converted by the AC-DC adapter 20 into AC power suitable for wireless power transmission, a transmitting coil 32 wirelessly transmitting power based on the AC power converted by the AC/DC converter 31, and a second controller 33 switching the DC/AC converter 31.

The wireless power receiving apparatus 40 includes the receiving coil 41 coupled to the battery 42, for receiving power that is wirelessly transmitted by the transmitting coil 32 and then employed to charge the battery 42.

A. First Embodiment

Figure 2:
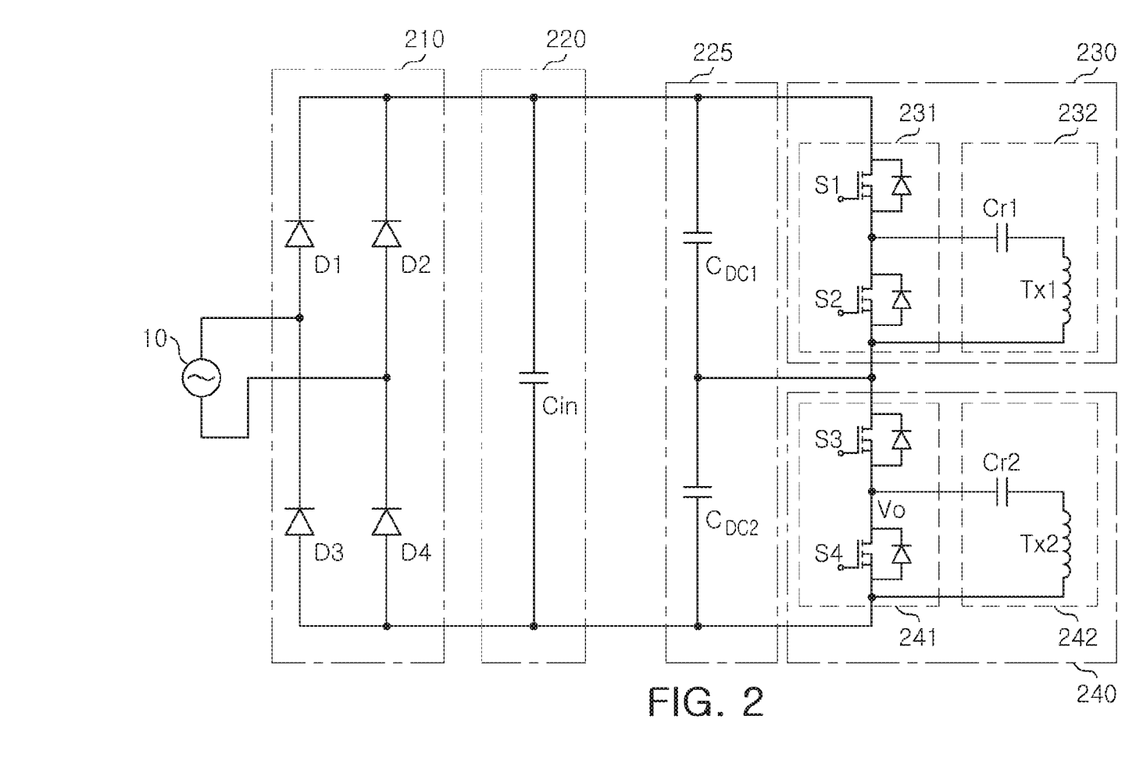
FIG. 2 is a circuit diagram illustrating an example of a wireless power transmitting device configured to transmit power according to heterogeneous standards.

As illustrated in FIG. 2, the wireless power transmitting device includes the AC power supply 10, a rectifier 210, an input capacitor 220, a voltage divider 225, a first wireless power transmitter 230, and a second wireless power transmitter 240.

In addition, the voltage divider 225 includes a first capacitor $C_{DC1}$ and a second capacitor $C_{DC2}$. The first wireless power transmitter 230 includes a first DC-AC converter 231 and a first transmitting resonator 232, and the second wireless power transmitter 240 includes a second DC-AC converter 241 and a second transmitting resonator 242.

The rectifier 210 rectifies AC power provided by the AC power supply 10, and the rectified AC power is stored in the input capacitor 220 as DC power.

The first capacitor $C_{DC1}$ divides a voltage of the DC power stored in the input capacitor 220 and stores a first divided voltage, and the first wireless power transmitter 230 wirelessly transmits power using the first divided power.

The first DC-AC converter 231 converts a voltage of the first divided power into a first output voltage for wireless power transmission, and power according to the first output voltage is wirelessly transmitted by the first transmitting resonator 232 to a receiving side.

Here, as illustrated in FIG. 2, the first DC-AC converter 231 is a half-bridge type in which two switches S1 and S2 are connected to each other in series. Any suitable arrangement such as a full-bridge type, or other type may be employed, although not illustrated in FIG. 2.

In addition, the first transmitting resonator 232 includes a capacitor Cr1 and an inductor Tx1, determining a resonance frequency, and determining a first resonance frequency. The inductor Tx1 is configured in the form of a coil for transmission, though other suitable configurations may be employed.

As such, the second capacitor $C_{DC2}$ divides a voltage of DC power stored in the input capacitor 220 and stores the second divided power. The second wireless power transmitter 240 wirelessly transmits power using the second divided power.

The second DC-AC converter 241 converts a voltage of the second divided power into a second output voltage for wireless power transmission, and power according to the second output voltage is wirelessly transmitted to a receiving side by the second transmitting resonator 242.

Here, the second DC-AC converter 241 uses a half-bridge type in which two switches S3 and S4 are connected in series as illustrated in FIG. 2. Other suitable converters or bridges such as a full-bridge type may be employed although not illustrated in FIG. 2. In addition, the second transmitting resonator 242 includes a capacitor Cr2 and an inductor Tx2, determining a resonance frequency, and determining a second resonance frequency. The inductor Tx2 is configured in the form of a coil or other geometries for transmissions.

A first resonance frequency fr1 and a second resonance frequency fr2 may be different resonance frequencies. For example, the first resonance frequency fr1 may be a wireless power consortium (WPC) standard frequency or a power matters alliance (PMA) standard frequency, and the second resonance frequency fr2 may be an alliance for wireless power (A4WP) standard frequency. The WPC standard frequency is generally about 110 kHz to about 205 kHz, the PMA standard frequency is about 277 kHz to about 357 kHz, and the A4WP standard frequency is about 6.78 MHz.

That is, the aforementioned first wireless power transmitter 230 wirelessly transmits power according to a wireless charging standard using a magnetic induction method, for example, the wireless power consortium (WPC) or the power matters alliance (PMA) standard, and the aforementioned second wireless power transmitter 240 wirelessly transmits power according to a different wireless charging standard using a magnetic resonance method, for example, the A4WP standard.

As described above, a single stage may be configured by removing a conventional AC-DC adapter, thereby enhancing efficiency of a wireless power transmitting device.

A high input voltage may be divided and used as a low voltage using a capacitor so as to miniaturize the size of a capacitor or a switching component size. For example, with respect to an A4WP method that requires a low rated voltage and a high switching frequency (6.78 MHz), switching loss and switching stress may be reduced.

B. Second Embodiment

Figure 3:
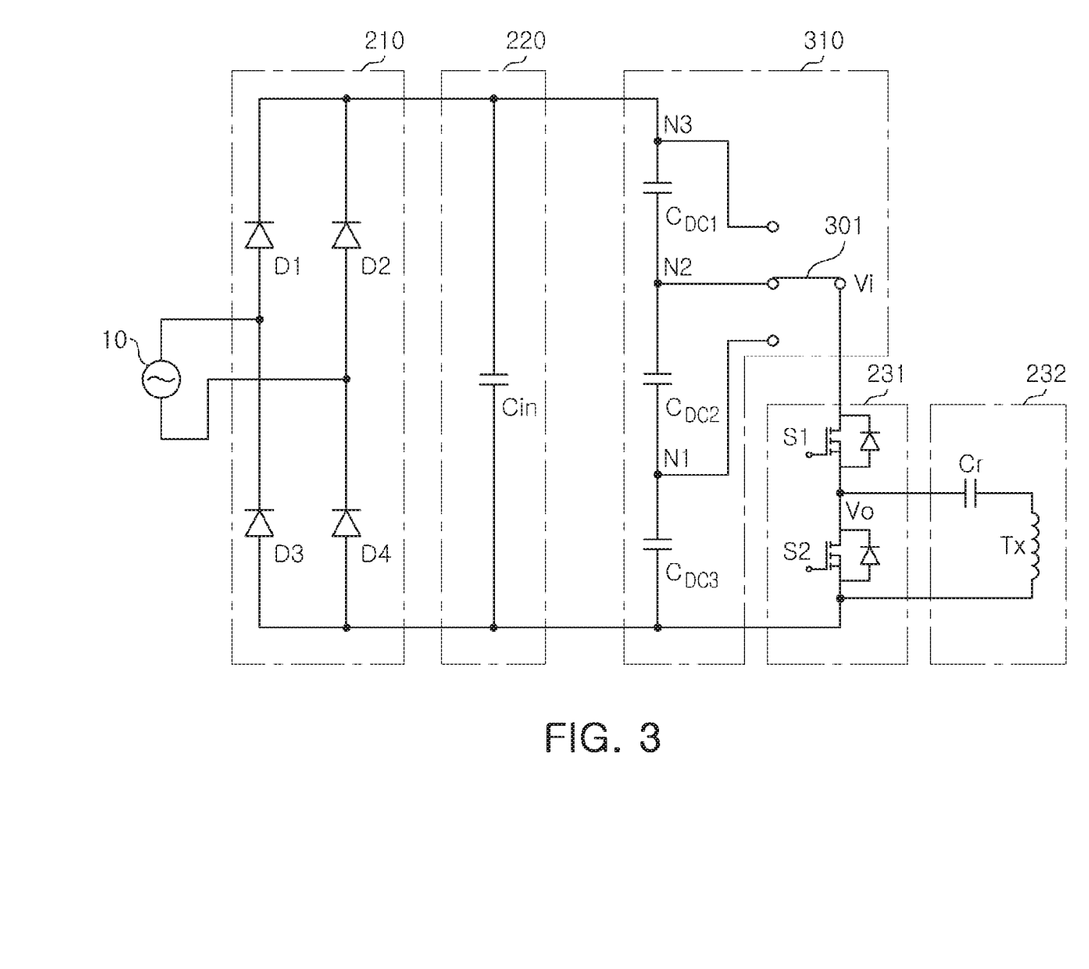
FIG. 3 is a circuit diagram illustrating another example of a wireless power transmitting device.

As illustrated in FIG. 3, the wireless power transmitting device includes the AC power supply 10, the rectifier 210, the input capacitor 220, a voltage divider 310 including a plurality of capacitors connected to each other in series, a DC-AC converter 231, and a transmitting resonator 232. In addition, the voltage divider 310 includes a plurality of capacitors $C_{DC1}$ to $C_{DC3}$ and a capacitor switch 301.

In detail, the rectifier 210 rectifies AC power provided by the AC power supply 10, and the rectified AC power is stored in the input capacitor 220 as DC power.

The voltage divider 310 divides a voltage of the DC power stored in the input capacitor 220 according to a capacitor ratio and then stores the divided voltages in a plurality of capacitors $C_{DC1}$ to $C_{DC3}$, respectively.

The capacitor switch 301 connects an input terminal of the DC-AC converter 231 to any one of the capacitors $C_{DC1}$ to $C_{DC3}$ so as to vary an amplitude of an input voltage Vi input to the DC-AC converter 231.

The DC-AC converter 231 outputs an output voltage for wireless power transmissions using the input voltage Vi, and power according to the output voltage is wirelessly transmitted to a receiving side by the transmitting resonator 232.

Here, as illustrated in FIG. 3, the DC-AC converter 231 uses a half-bridge type in which two switches are connected to each other in series. In addition, the second transmitting resonator 242 includes a capacitor Cr and an inductor Tx, determining a resonance frequency.

Here, in order to obtain a voltage Vo (hereinafter, referred to as an output voltage) of desired output power from the DC-AC converter 231, a method for adjusting a switching duty of the switches S1 to S2 included in the DC-AC converter 231 and a method for varying amplitude of the input voltage Vi of the DC-AC converter 231 is used.

However, in general, a harmonic component is varied according to a switching duty.

Figure 4A:
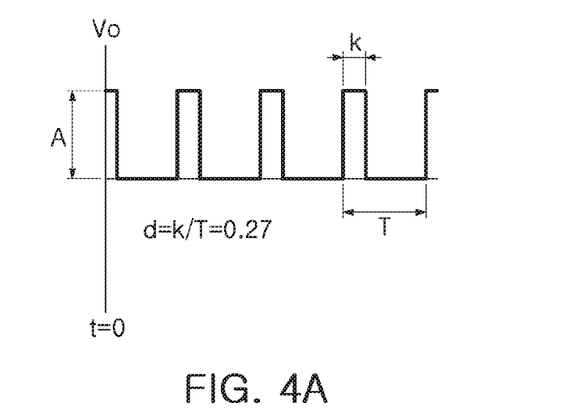
Figure 4B:
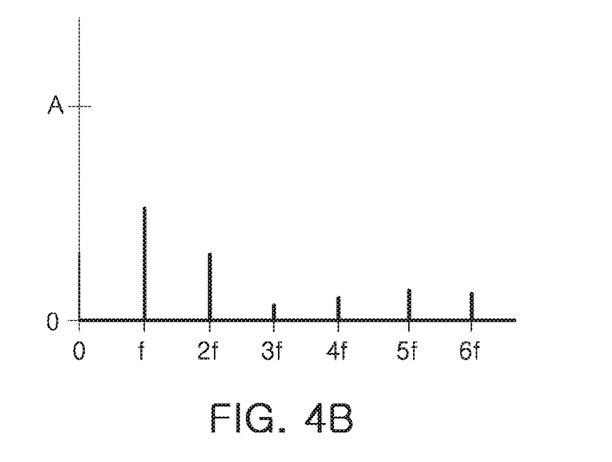
Figure 5A:
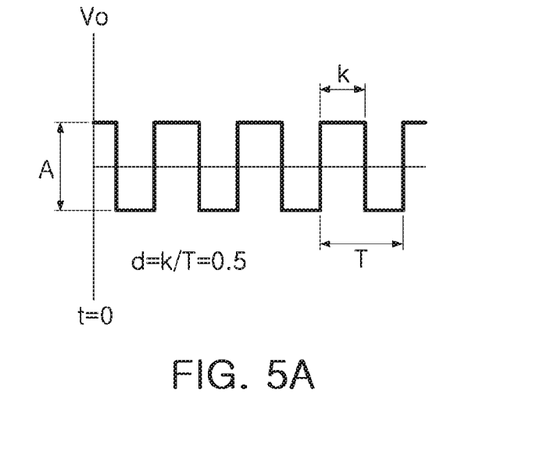
Figure 5B:
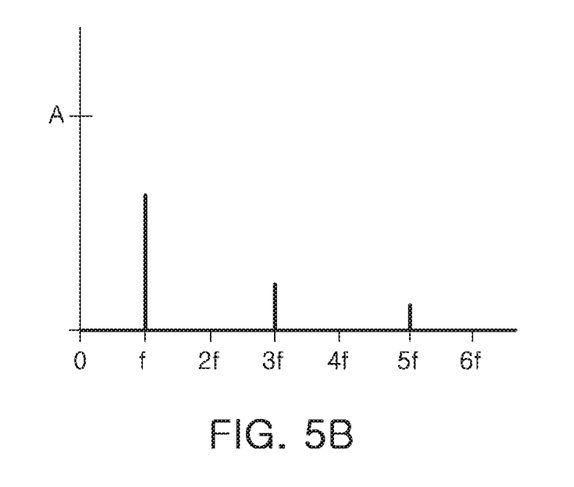

FIGS. 4A-4B and 5A-5B are diagrams for comparison of harmonic components according to a switching duty. FIGS. 4A and 5A are diagrams illustrating an output voltage Vo of a DC-AC converter 231 in the time domain, and FIGS. 4B and 5B are diagrams illustrating an output voltage Vo of the DC-AC converter 231 in the frequency domain.

FIG. 4A is a diagram illustrating an output voltage Vo with a switching duty of 0.27, and FIG. 5A is a diagram illustrating an output voltage Vo with a switching duty of 0.5.

As seen in the FIGS., when a switching duty is 0.5, there is a lower harmonic component than in the case in which a switching duty is 0.27. For this reason, when a switching duty is about 0.5, an issue in terms of loss in harmonics or EMI may be relieved.

Accordingly, amplitude of the input voltage Vi of the DC-AC converter 231, for acquisition of a desired output voltage Vo of the DC-AC converter 231 when a switching duty of the DC-AC converter 231 is fixed as 0.5, may be determined. Then the capacitor switch 301 may be controlled to satisfy the determined amplitude of the input voltage Vi so as to connect an input terminal of the DC-AC converter 231 to any one of the capacitors $C_{DC1}$ to $C_{DC3}$.

For example, as illustrated in FIG. 3, assuming that the voltage divider 310 includes three capacitors $C_{DC1}$ to $C_{DC3}$ that are connected to each other in series and the three capacitors $C_{DC1}$ to $C_{DC3}$ have the same capacity, a voltage of node 1 N1 is Vdc/3, a voltage of node 2 N2 is 2Vdc/3, and a voltage of node 3 N3 is Vdc, and the capacitor switch 301 is controllable in such a way that amplitude of the input voltage Vi of the DC-AC converter 231 is any one of Vdc/3, 2Vdc/3, and Vdc.

However, in the aforementioned example, a voltage of each of the nodes N1 to N3 has a discrete voltage, and thus desired amplitude of the input voltage Vi may not be accurately satisfied. Accordingly, capacitors may be determined to acquire a value that is most approximate to the desired input voltage Vi, and in order to acquire a desired output voltage Vo of a DC-AC converter 320, a switching duty of the DC-AC converter 331 is adaptively adjusted with relatively fine changes centered around about 0.5.

According to another example, the voltage divider 310 includes two capacitors that are connected to each other in series, and one of the two capacitors is a variable capacitor so as to more precisely adjust desired amplitude of the input voltage Vi.

C. Third Embodiment

Figure 6:
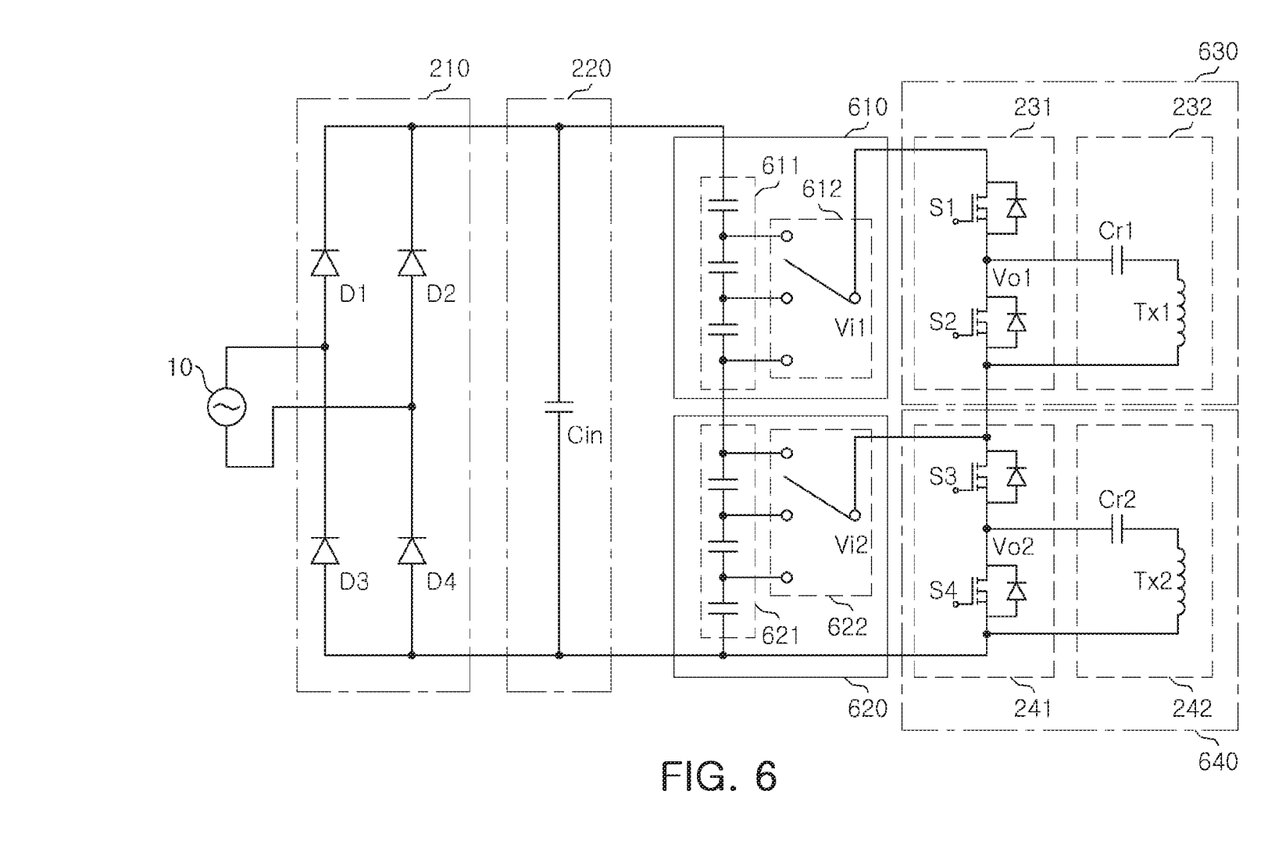
FIG. 6 is a circuit diagram illustrating another example of a wireless power transmitting device.

FIG. 6 is a circuit diagram illustrating another example of a wireless power transmitting device, and is obtained by applying the voltage divider 310 of FIG. 3 to the first and second wireless power transmitters 230 and 240 of FIG. 2. Accordingly, for conciseness and clarity, repeated configurations and operations will not be described again.

As illustrated in FIG. 6, a voltage divider includes a first voltage divider 610 and a second voltage divider 620. In addition, a first wireless power transmitter 630 includes the first DC-AC converter 231 and the first transmitting resonator 232, and a second wireless power transmitter 640 includes the second DC-AC converter 241 and the second transmitting resonator 242.

The first voltage divider 610 includes a first capacitor variable part 611 including a plurality of capacitors and a first capacitor switch 612, and the second voltage divider 620 includes a second capacitor variable part 621 including a plurality of capacitors and a second capacitor switch 622.

The first capacitor variable part 611 includes a plurality of capacitors dividing and storing a voltage of DC power stored in an input capacitor Cin, and the first capacitor switch 612 may be controlled to connect an input terminal of the first DC-AC converter 231 to one end of one capacitor of the plurality of capacitors.

That is, the first voltage divider 610 selects one voltage of a plurality of divided DC voltages stored in a plurality of capacitors as a first input voltage Vi1.

A method for varying the first input voltage Vi1 of the first DC-AC converter 231 using the first capacitor switch 612 is the same as the description of FIG. 3, and thus a detailed description thereof will be omitted here for clarity and conciseness.

The first wireless power transmitter 630 wirelessly transmits power using the first input voltage Vi1.

The first DC-AC converter 231 converts the first input voltage Vi1 into a first output voltage Vo1 for wireless power transmission, and the first transmitting resonator 232 transmits power according to the first output voltage Vo1.

In addition, configurations and operations of the second voltage divider 620 and the second wireless power transmitter 640 are understood with reference to the aforementioned configurations and operations of the first voltage divider 610 and the first wireless power transmitter 630, and thus a detailed description thereof will be omitted.

The apparatuses, units, modules, devices, and other components (e.g., the rectifier 21, converter 22, first controller 23, second controller 33, and the like) illustrated in FIGS. 1-3 and 6 that perform the operations described herein are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described herein may be performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

As a non-exhaustive example only, an electronic device as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

As described above, according to an embodiment, efficiency of the wireless power transmitting device may be enhanced.

According to another embodiment, high frequency switching may be possible with a low rated voltage as input, and thus the wireless power transmitting device may be miniaturized, and switching loss and switching stress may be reduced.

As set forth above, according to embodiments, efficiency of a wireless power transmitting device may be enhanced.

In addition, according to other embodiments, high frequency switching may be possible with a low rated voltage as input, and thus the wireless power transmitting device may be miniaturized, and switching loss and switching stress may be reduced.

What is claimed is:

1. A wireless power transmitting device comprising:
   a rectifier configured to rectify alternating current (AC) power;
   a capacitor configured to store the rectified AC power as direct current (DC) power;
   a voltage divider configured to divide a voltage of the DC power; and
   a wireless power transmitter configured to transmit power using the voltage divided by the voltage divider.

2. The wireless power transmitting device of claim 1, wherein the voltage divider comprises:
   a first capacitor configured to divide a voltage of the DC power and storing a first divided power; and
   a second capacitor configured to divide the voltage of the DC power and storing a second divided power.

3. The wireless power transmitting device of claim 2, wherein the wireless power transmitter comprises:
   a first wireless power transmitter configured to wirelessly transmit power using the first divided power; and
   a second wireless power transmitter configured to wirelessly transmit power using the second divided power.

4. The wireless power transmitting device of claim 3, wherein:
   the first wireless power transmitter comprises a first DC-AC converter configured to convert a voltage of the first divided power into a first output voltage for wireless power transmission, and a first transmitting resonator configured to transmit power according to the first output voltage; and
   the second wireless power transmitter comprises a second DC-AC converter configured to convert a voltage of the second divided power into a second output voltage for wireless power transmission, and a second transmitting resonator configured to transmit power according to the second output voltage.

5. The wireless power transmitting device of claim 4, wherein each of the first DC-AC converter and the second DC-AC converter comprise a serially connected half bridge or full bridge structure.

6. The wireless power transmitting device of claim 4, wherein:
   the first transmitting resonator comprises a capacitor and an inductor, configured to determine a first resonance frequency; and
   the second transmitting resonator comprises a capacitor and an inductor, configured to determine a second resonance frequency.

7. The wireless power transmitting device of claim 4, wherein a resonance frequency of the first transmitting resonator and a resonance frequency of the second transmitting resonator are different.

8. A wireless power transmitting device comprising:
   a rectifier configured to rectify alternating current (AC) power;
   an input capacitor configured to store the rectified Ac power as direct current (DC) power;
   a voltage divider comprising a plurality of capacitors connected to the capacitor in parallel and configured to divide a voltage of the DC power; and
   a wireless power transmitter connected to one end of at least one of the capacitors and configured to wirelessly transmit power.

9. The wireless power transmitting device of claim 8, wherein the voltage divider includes:
   a first voltage divider comprising a plurality of capacitors configured to divide and store a voltage of DC power stored in the input capacitor and a first capacitor switch selecting a voltage of one end of one of the capacitors as a first input voltage; and
   a second voltage divider including a plurality of capacitors configured to divide and store a voltage of DC power stored in the input capacitor and a second capacitor switch selecting a voltage of one end of one of the capacitors as a second input voltage.

10. The wireless power transmitting device of claim 9, wherein the wireless power transmitter includes:
    a first wireless power transmitter configured to wirelessly transmit power using the first input voltage; and
    a second wireless power transmitter configured to wirelessly transmit power using the second input voltage.

11. The wireless power transmitting device of claim 10, wherein:
    the first wireless power transmitter comprises a first DC-AC converter configured to convert the first input voltage into a first output voltage for wireless power transmission, and a first transmitting resonator configured to transmit power according to the first output voltage; and
    the second wireless power transmitter comprises a second DC-AC converter configured to convert the second input voltage into a second output voltage for wireless power transmission, and a second transmitting resonator configured to transmit power according to the second output voltage.

12. The wireless power transmitting device of claim 11, wherein each of the first DC-AC converter and the second DC-AC converter comprise a serially connected half bridge or full bridge structure.

13. The wireless power transmitting device of claim 11, wherein:
    the first transmitting resonator comprises a capacitor and an inductor, configured to determine a first resonance frequency; and
    the second transmitting resonator comprises a capacitor and an inductor, configured to determine a second resonance frequency.

14. The wireless power transmitting device of claim 13, wherein a resonance frequency of the first transmitting resonator and a resonance frequency of the second transmitting resonator are different.

15. A method of controlling a wireless power transmitter, comprising:
    identifying a wireless power receiver characteristic;
    selectively dividing an input voltage into a divided voltage, using a multi-tap capacitor network, according to the identified wireless power receiver characteristic; and,
    adaptively adjusting a duty cycle of a DC-AC converter or capacitance of a variable capacitor, or combinations thereof, to transform the divided voltage into a wireless power transmission voltage substantially corresponding to the identified wireless power receiver characteristic.

16. The method of controlling a wireless power transmitter of claim 15, further comprising actuating a rectifier to rectify a first voltage to the input voltage.

17. The method of controlling a wireless power transmitter of claim 15, wherein the selectively dividing the input voltage comprises executing a controller to selectively actuate a switch coupled to the multi-tap capacitor network based on the identified wireless power receiver characteristic.

18. The method of controlling a wireless power transmitter of claim 15, wherein a controller is executed to adaptively adjust the duty cycle or the capacitance of the variable capacitor, or combinations thereof, based on a detected harmonic component or electromagnetic interference (EMI), or combinations thereof, to iteratively adjust the wireless power transmission voltage to approximate a voltage corresponding to the identified wireless power receiver characteristic.

19. The method of controlling a wireless power transmitter of claim 18, wherein the duty cycle is adaptively adjusted centered approximately around a 0.5 duty cycle.

20. The method of controlling a wireless power transmitter of claim 15, further comprising selectively actuating one of a plurality of resonators based on the identified wireless power receiver characteristic.

21. The method of controlling a wireless power transmitter of claim 20, wherein a first resonator of the plurality of resonators is selectively actuated responsive to a detected Wireless Power Consortium (WPC) or Power Matters Alliance (PMA) wireless power receiver characteristic; and a second resonator of the plurality of resonators is selectively actuated responsive to a detected Alliance For Wireless Power (A4WP) wireless power receiver characteristic.

22. The method of controlling a wireless power transmitter of claim 20, wherein the first resonator of the plurality of resonators is selectively actuated for magnetic inductance based wireless power transmission and a second resonator of the plurality of resonators is selectively actuated for magnetic resonance based wireless power transmission.

* * * * *